United States Patent
Eacmen, III et al.

(10) Patent No.: US 10,943,015 B2
(45) Date of Patent: Mar. 9, 2021

(54) CONTINUOUS MONITORING FOR DETECTING FIRMWARE THREATS

(71) Applicant: ReFirm Labs, Inc., Fulton, MD (US)

(72) Inventors: Peter P. Eacmen, III, Clarksville, MD (US); Terry J. Dunlap, Jr., Olney, MD (US)

(73) Assignee: ReFirm Labs, Inc., Fulton, MD (US)

( * ) Notice: Subject to any disclaimer, the term of this patent is extended or adjusted under 35 U.S.C. 154(b) by 268 days.

(21) Appl. No.: 15/928,863

(22) Filed: Mar. 22, 2018

(65) Prior Publication Data

US 2019/0294802 A1    Sep. 26, 2019

(51) Int. Cl.
*G06F 21/50* (2013.01)
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 7,207,065 B2 | 4/2007 | Chess et al. | |
| 7,424,706 B2 * | 9/2008 | Ivanov | G06F 21/57 717/169 |
| 8,726,392 B1 | 5/2014 | McCorkendale et al. | |
| 9,069,967 B2 | 6/2015 | Wysopal et al. | |
| 9,230,099 B1 | 1/2016 | McCorkendale et al. | |
| 9,258,320 B2 | 2/2016 | Hayrynen et al. | |
| 9,645,800 B2 | 5/2017 | Sheth | |
| 9,672,355 B2 | 6/2017 | Titonis et al. | |
| 9,824,223 B2 | 11/2017 | Pappas | |
| 2007/0277241 A1 * | 11/2007 | Repasi | G06F 21/57 726/24 |
| 2013/0097706 A1 * | 4/2013 | Titonis | H04W 12/12 726/24 |
| 2013/0347104 A1 * | 12/2013 | Raber | G06F 21/55 726/22 |

(Continued)

FOREIGN PATENT DOCUMENTS

EP    2610776 A2    7/2013

OTHER PUBLICATIONS

Towards Firmware Analysis of Industrial Internet of Things(IIoT) Applying Symbolic Analysis to IIoT Firmware Vetting. Palavicini et al. IoTBDS. (Year: 2017).*

(Continued)

*Primary Examiner* — Venkat Perungavoor
(74) *Attorney, Agent, or Firm* — Carr & Ferrell LLP

(57) ABSTRACT

Continuous monitoring for detecting firmware threats is provided herein. An example system includes a processing pipeline that receives a firmware image from an entity, an extractor that receives the firmware image through the processing pipeline, the extractor being configured to determine and extract files within the firmware image, a task queue that receives the extracted files and one or more analyzers that: obtain the files from the task queue; and perform at least one type of vulnerability analysis on the files. The system includes a database that stores a log of the at least one type of vulnerability analysis, the log being associated with any of the firmware image and a device identifier of the device.

17 Claims, 4 Drawing Sheets

(56) References Cited

U.S. PATENT DOCUMENTS

| | | | |
|---|---|---|---|
| 2014/0137190 A1* | 5/2014 | Carey | G06F 21/577 |
| | | | 726/3 |
| 2014/0150100 A1* | 5/2014 | Gupta | G06F 21/316 |
| | | | 726/22 |
| 2015/0074644 A1* | 3/2015 | Oberheide | G06F 9/44505 |
| | | | 717/122 |
| 2016/0112437 A1* | 4/2016 | Churyumov | G06F 21/43 |
| | | | 726/7 |
| 2016/0180096 A1 | 6/2016 | Sharma et al. | |
| 2016/0188879 A1* | 6/2016 | Sussman | G06F 21/568 |
| | | | 726/23 |
| 2016/0212099 A1* | 7/2016 | Zou | H04L 63/0263 |
| 2016/0212159 A1* | 7/2016 | Gupta | G06F 21/566 |
| 2017/0046512 A1* | 2/2017 | Kedma | G06F 11/3003 |
| 2018/0184290 A1* | 6/2018 | Luo | H04W 12/0401 |
| 2019/0249443 A1* | 8/2019 | Moghimi | E04F 13/147 |
| 2019/0294801 A1 | 9/2019 | Eacmen, III et al. | |

OTHER PUBLICATIONS

Automated Extraction of Vulnerability Information for Home Computer Security. Weerawardhana et al. LNCS. (Year: 2015).*

DiscovRE : Efficient Cross-Architecture Identification of Bugs in Binary Code. Eschweiler et al. NDSS. (Year: 2016).*

* cited by examiner

CONTINUOUS MONITORING FOR DETECTING FIRMWARE THREATS

CROSS-REFERENCE TO RELATED APPLICATIONS

This nonprovisional patent application is related to U.S. patent application Ser. No. 15/926,868, filed on Mar. 20, 2018, which is hereby incorporated by reference herein in its entirety, including all references and appendices cited therein, for all purposes.

FIELD OF THE PRESENT TECHNOLOGY

The present technology relates generally to computing and device security, and more specifically, but not by limitation, to systems and methods that allow for continuous or near-continuous monitoring of firmware images in order to detect threats against constituent parts of the firmware images. Some embodiments extract firmware components and analyze the firmware components with specifically configured analyzers. These analyzers can be updated and continually or periodically executed against a library of various versions of the firmware collected over time as well.

SUMMARY

Various embodiments of the present technology include a system comprising: a processing pipeline that receives a firmware image from an entity, the firmware image being indicative of firmware installed on a device of the entity; an extractor that receives the firmware image through the processing pipeline, the extractor being configured to determine and extract files within the firmware image; a task queue that receives the extracted files; one or more analyzers that: obtain the files from the task queue; and perform at least one type of vulnerability analysis on the files; and a database that stores a log of the at least one type of vulnerability analysis, the log being associated with any of the firmware image and a device identifier of the device.

Various embodiments of the present technology include a method comprising: receiving a firmware image from an entity, the firmware image being a copy of that which is installed on a device of the entity; placing the firmware image in a processing pipeline; determining and extracting files within the firmware image using an extractor; placing the extracted files in a task queue; launching one or more analyzers to: obtain the files from the task queue; perform a vulnerability analysis on the files; and wherein the one or more analyzers are selected based on the extracted files and their associated file types; and storing the firmware image and a log of the vulnerability analysis in a database, the log being associated with any of the firmware image and a device identifier of the device.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
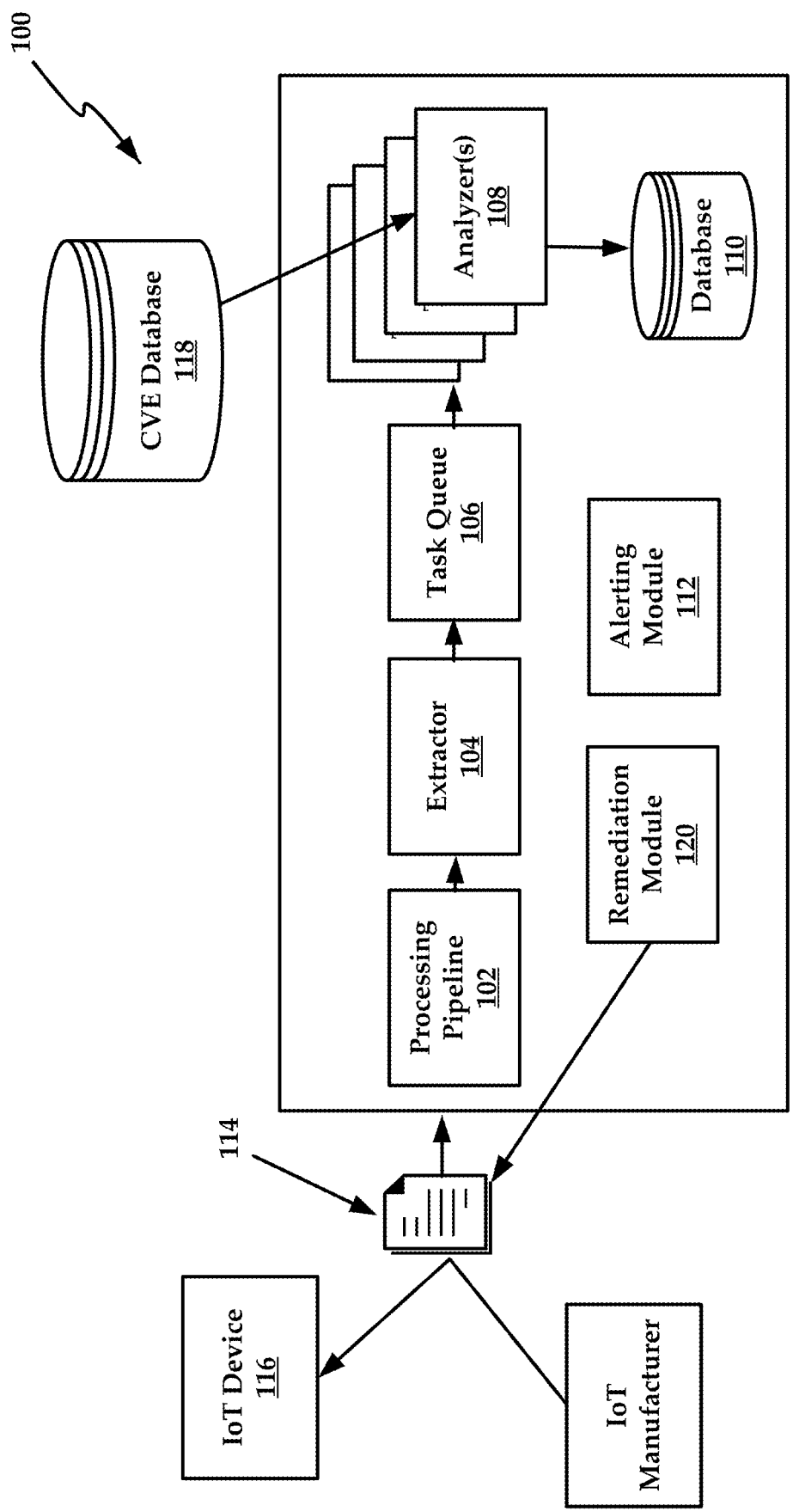
FIG. 1 is a high level schematic diagram of computing architecture for practicing aspects of the present technology.

The present disclosure is directed to various embodiments of systems and methods that allow for continuous or near-continuous monitoring of firmware in order to detect threats against firmware files. Some embodiments extract firmware components and analyze the firmware components with specifically configured analyzers. These analyzers can be updated and continually or periodically executed against a library of various versions of the firmware collected over time. Stated otherwise, the logic executed by the analyzers is continually updated (with new analyzers being created as well) in order to identify threats as they become known.

For context, the present disclosure is directed to systems and methods that detect vulnerabilities in firmware. In general, the firmware of a device is comprised of individual components or files such as executables that are used to control functioning of hardware on a computing device. These instructions are typically programmed into read-only memory. As the Internet-of-Things (IoT) increases in size from millions to billions of devices and becomes more ubiquitous, these IoT devices become more attractive to malicious actors who desire to control or utilize the IoT devices for malicious behavior. In some embodiments, the malicious actors will exploit vulnerabilities in firmware design in order to cause a desired malicious affect.

In addition, entities will often create many versions of IoT devices for similar or different purposes. For example, a company that creates smart sensors for manufacturing facilities may have IoT controllers for dozens or hundreds of devices on the manufacturing floor. Also, the firmware of a single IoT device is susceptible to change based on user requirements or other systematic or network changes of the entity's network. One of ordinary skill in the art will appreciate that many reasons may necessitate changes to a version of firmware for one or many IoT devices in a deployment. Thus, keeping track of firmware version is difficult when hundreds and even thousands of IoT devices are deployed. Also, the entity may maintain and utilize many iterations and version of devices which are all controlled by different versions of firmware (even possibly the same firmware in older versions).

The present disclosure provides solutions to these technical problems by implementing systems and methods that allow for vulnerability scanning of firmware images. These systems and methods receive firmware images for a device from an entity such as a device owner or manufacturer. The firmware image is processed to extract discrete firmware components such as executable files or other artifacts. Next, the systems and methods launch analyzers that process the discrete firmware components by comparing the discrete firmware components against entries in a common vulnerabilities and exposures (CVE) database. In general, the CVE stores known vulnerabilities specific to software components which may be used when building firmware.

When a match is found, the systems and methods of the present disclosure can then flag any of the discrete firmware components as being subject to a vulnerability (such as a high-risk executable in the firmware, for example). The systems and methods can then alert both the device manufacturer and/or the end user of the vulnerability of the device. In some instances, devices can be identified by a unique identifier that is also linked to the manufacturer and/or the customer of the manufacturer. The unique identifier for the device can also be linked to the firmware image.

The systems and methods herein can also, in some embodiments, quarantine or recommend a quarantine of the device until the vulnerability is fixed. In other embodiments, the systems and methods herein can remediate the vulnerability by removing a vulnerable firmware component or apply an instruction patch that fixes the vulnerability. The remediated firmware can be pushed back to the manufacturer and/or device for installation.

In some embodiments, the systems and methods herein can store various logs of vulnerability scans in a database. The logs are linked to the devices and/or manufacturer or other entity, for example, using the device identifier mentioned above. Thus, various firmware versions for a single device type or multiple device types can be stored in the database, which functions as a firmware and data vault.

Over time, the analyzers used to scan the firmware components are updated as new threats are identified. Thus, in some embodiments, the systems and methods herein can periodically or continually rescan all (or a portion of) the firmware images stored in the database in order to determine if the updated analyzers find new threats which were not discovered using older versions of analyzers. Thus, based on feedback or changes to the CVE, the systems and methods herein update analyzer schemas used to perform vulnerability analyses. Each time an analyzer is updated in terms of its analyzer schema, the entire (or portion thereof) catalogue of firmware images can be rescanned and reviewed.

These and other advantages of the present disclosure are provided herein with reference to the collective drawings.

FIG. 1 is a schematic diagram of an example firmware vulnerability detection system (hereinafter system 100) that is constructed in accordance with the present disclosure. The system 100 generally comprises a processing pipeline 102, an extractor 104, a task queue 106, one or more analyzers (such as analyzer 108), a database 110, and an alerting module 112. In general, the components of the system 100 can be implemented as standalone components or integrated together.

In some embodiments, the system 100 receives firmware images, such as firmware image 114 from a manufacturer of an IoT device 116. The IoT device 116 can be deployed in some embodiments with a customer of the manufacturer. In other embodiments, the firmware of the IoT device 116 can be scanned and updated prior to delivery to the customer. Continual or periodic scanning of current and/or newer versions of firmware for the IoT device 116 can be performed with the system 100.

In one or more embodiments, the system 100 can implement or utilize a common vulnerabilities and exposures (CVE) database 118. This CVE database 118 can reside with the system 100 or can be accessed by the system 100 as a third party service.

In various embodiments, the processing pipeline 102 may receive firmware images from a manufacturer (or other entity). This can be accomplished by a manufacturer system uploading or otherwise transmitting the firmware images to the system 100 over a network. As noted above, the firmware image is indicative of firmware installed on a device of the entity.

As the firmware images are received, they can be placed into the processing pipeline 102 in any desired order such as first in, first out (FIFO). A firmware image is then selected by the extractor 104. The extractor 104 utilizes rule sets or other signatures to open the firmware image and inspect the firmware image to determine its contents. Broadly, the extractor 104 is configured to determine and extract files within the firmware image in a recursive manner. In some embodiments, extractor 104 scans a file for signatures (i.e. markers) of either a file or a file container. When those markers are found, the file is carved out of the file being scanned and the extractor 104 then continues to examine for more signatures in the file or the file container being scanned. For each carved file, it is then either extracted (if it was a file container), or if it was an individual file, it would then be added to the task queue 106 for analysis. For files that are extracted, the extractor 104 is re-run on extracted files in the event that there are file containers within file containers (hence the recursive functionality mentioned infra).

Once the discrete components (e.g., files) of the firmware image are located, the extractor 104 may extract the components and place them into the task queue 106 for further processing. In some embodiments, the firmware image can comprise components such as executable files, cryptographic hashes, passwords, and so forth.

The components of the firmware image can be placed into the task queue 106 based on type. For example, the extractor 104 can place the executable files in a batch or group within the task queue 106, while cryptographic keys and other components are placed into their own batch or group. In some embodiments, each artifact extracted from the firmware image can be placed into a single task queue.

Once the firmware image has had its contents extracted and the task queue 106 is loaded, one or more analyzers are launched to perform one or more types of vulnerability analysis on the components in the task queue 106. In one example, each analyzer can obtain components from one or more of the groups or batches in the task queue 106. For example, a set of analyzers, such as the analyzer 108, are utilized to process executable files using various algorithms that compare the components of the firmware image to entries or objects in the (CVE) database 118.

In some embodiments, the analyzer 108 can analyze binary code of the files in a firmware image to determine if an executable file (one of the files in the firmware image) has a vulnerability.

Some example scanning tasks include detecting private keys left behind by a manufacturer. To be sure, a developer accidentally leaving a private signing key in a firmware image can result in deleterious effects if this key falls into the hands of a malicious actor. For example, it could allow attackers to modify and replace firmware signed as the manufacturer. Thus, one analyzer can be configured to detect private signing keys in an IoT device firmware image.

Another example analyzer embodiment can detect passwords hard-coded into firmware images. To be sure, it is also worse when those passwords use weak cryptographic algorithms. Weak passwords are easier to crack which could lead to an attacker controlling the IoT device. Thus, the analyzer can detect not only the presence of a password, but also the strength of the password based on known attributes about the password schema. The analyzer can also predict a lifespan of the password inferentially.

Additional examples of analyzers can be used to search and examine object code, drivers, and other binaries. In some instances, these firmware components are provided to the manufacturer from other vendors. For example, a smart sensor manufacturer may obtain wireless modules from a vendor and the vendor may supply firmware components for their wireless module that is integrated into the firmware image. Independent testing of these components using the systems and methods disclosed herein can allow the manufacturer to test firmware components not created by the manufacturer.

In general, the analyzer 108 can be configured to obtain the files from the task queue 106 and perform at least one type of vulnerability analysis on the files (or a portion thereof). The output of the vulnerability analysis can be stored in a log file or other similar record.

Once the one or more analyzers have performed their file analysis of the components of the firmware image, the log files are then stored in the database 110. That is, the database 110 stores a log of the at least one type of vulnerability analysis. In some instances, the log is associated with any of the firmware image and a device identifier of the device with which the firmware is associated. In some embodiments, the database includes records or logs that include not only the device identifier, the firmware image, and the firmware analysis, but also a version of the firmware image.

In various embodiments, when a new firmware image is output by the manufacturer, the firmware image is processed using the systems and methods above and the resulting output is stored in the database. Thus, the database stores additional logs from other vulnerability analyses of other firmware images of the device that are older and/or newer versions of the firmware image.

The alerting module 112 can be used to transmit a message to the manufacturer and/or the customer in real-time or near real-time when a vulnerability analysis indicates that a possible problem exists such as a match between the files of a firmware image and one or more CVE database entries, the presence of a hidden cryptographic key, the presence of a password (e.g., password hash), or other similar flaws in the firmware image. The alert message can include an identification of the device (or a general device type) through its device identifier or an identification of the firmware image and the vulnerable component(s). This device is linked back to a manufacturer through an identifier. In one embodiment, a match between an executable file in a firmware image and a CVE database entry is referred to generally as a high-risk executable. Another example type of vulnerability analysis includes scanning the files of a firmware image for artifacts when the files are executables and extracts out versioning information.

Another type of vulnerability analysis includes scanning the files for strings of characters that are indicative of a vulnerability. For example, if an executable file of a manufacturer has a known name and is implicated as vulnerable, the analyzer can scan for the file name without having to scan the entire contents of the file.

These messages can be transmitted in real-time or near real-time, which is a critical process in detecting and preventing the spread of malicious code or behavior in an IoT system. That is, without the ability to quickly identify and neutralize a threat, the IoT system would remain vulnerable. The systems and methods disclosed herein ensure that prompt remediation occurs.

In various embodiments, the system 100 can include a remediation module 120 that automatically repairs or removes any of the files that are determined to be vulnerable based on the comparison of the files of a firmware image to the CVE database 118. The remediation module 120 can be configured to perform one or more types of remediation of the files of the firmware image if desired. For example, if an analyzer detects the presence of a high-risk executable, the remediation module 120 can delete the high-risk executable or replace the same with a low-risk executable. The remediation module 120 can receive a replacement low-risk executable from the manufacturer, for example. In some embodiments, the remediation module 120 can push a remediated firmware image to the IoT device or the manufacturer.

When the risk is associated with a hidden cryptographic key, the remediation module 120 can delete or otherwise disable the hidden cryptographic key. If the risk is an embedded password, the remediation module 120 can delete the embedded password or otherwise render it unusable.

In some embodiments, the remediation module 120 can cause the IoT device to be quarantined until remediation by the manufacturer is undertaken, such as provisioning a new firmware image.

As mentioned above, the system 100 can be configured to keep a repository of vault of firmware images for an entity. As new vulnerabilities are discovered and new analyzers are configured and/or old analyzers are updated, the system 100 can be configured to reprocess every firmware image (or a portion thereof) for the entity as the vulnerability landscape changes.

Thus, the system 100 is configured to re-execute one or more types of vulnerability analyses when the one or more analyzers are updated or new analyzers are created. These analyzers are then run against all previously extracted artifacts in the database such that all firmware images for the entity are analyzed. To be sure, a manufacturer can often deploy and service many versions of firmware images for devices. The system 100 can periodically or continually run firmware vulnerability analyses on these vault stored firmware images and inform the manufacturer when a vulnerability is found.

Figure 2:
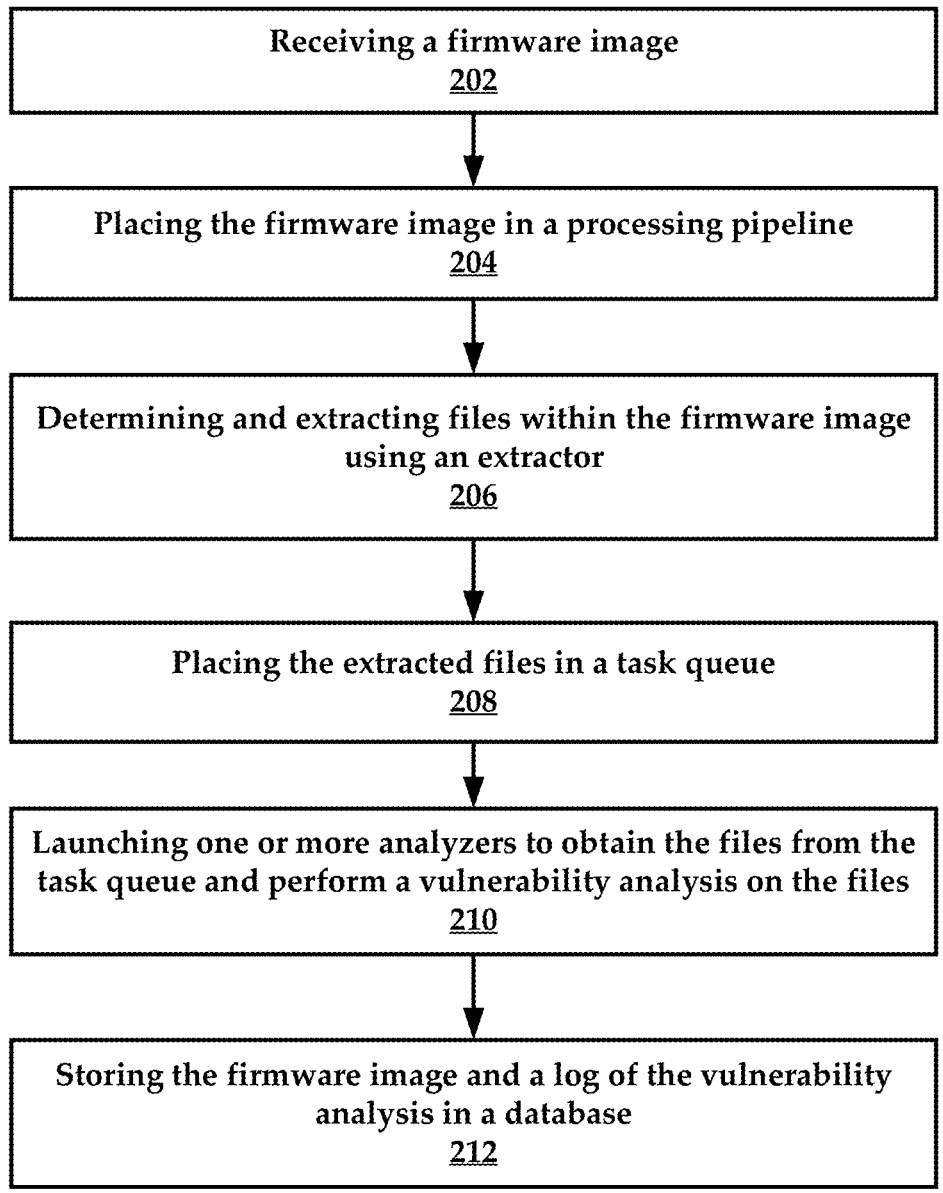
FIG. 2 is a flowchart of an example method of the present disclosure.

FIG. 2 is a flowchart of an example method of the present disclosure. In some embodiments, the method includes a step 202 of receiving a firmware image from an entity. As noted above, the firmware image is a copy of that which is installed on a device of the entity. The firmware image is analyzed remotely from the device so as not to deleteriously affect device performance.

Next, the method includes a step 204 of placing the firmware image in a processing pipeline, and a step 206 of determining and extracting files within the firmware image using an extractor. These files can include executables or other components of a firmware image. The contents of the firmware image depend on the types of hardware present on the device.

In various embodiments, the method includes a step 208 of placing the extracted files in a task queue and a step 210 of launching one or more analyzers to obtain the files from the task queue and perform a vulnerability analysis on the files.

To be sure, the one or more analyzers are selected based on the extracted files and their associated file types. In one or more embodiments, the method includes a step 212 of storing the firmware image and a log of the vulnerability analysis in a database. As noted above, the log or record is associated with any of the firmware image and a device identifier of the device.

The method can also include optional steps such as re-launching the one or more analyzers to perform an updated vulnerability analysis on the files at a subsequent point in time after the one or more analyzers have been updated. The updated vulnerability analysis is executed against the firmware image stored in the database, in some instances.

The method also can include storing additional logs from other vulnerability analyses of other firmware images of the device that are older versions of the firmware image. It will be understood that the updated vulnerability analysis is performed against the older versions of the firmware image, along with the current firmware image.

In various embodiments, the method can include an optional step of transmitting a message to the entity in real-time or near real-time that at least one type of vulnerability analysis indicates that a vulnerability exists. The message can indicate which file of the files in the firmware image is implicated relative to the vulnerability.

In accordance with the present disclosure, the method also includes a step of automatically repairing or removing any of the files that are determined to be vulnerable based on a comparison of the files to a CVE database.

Figure 3:
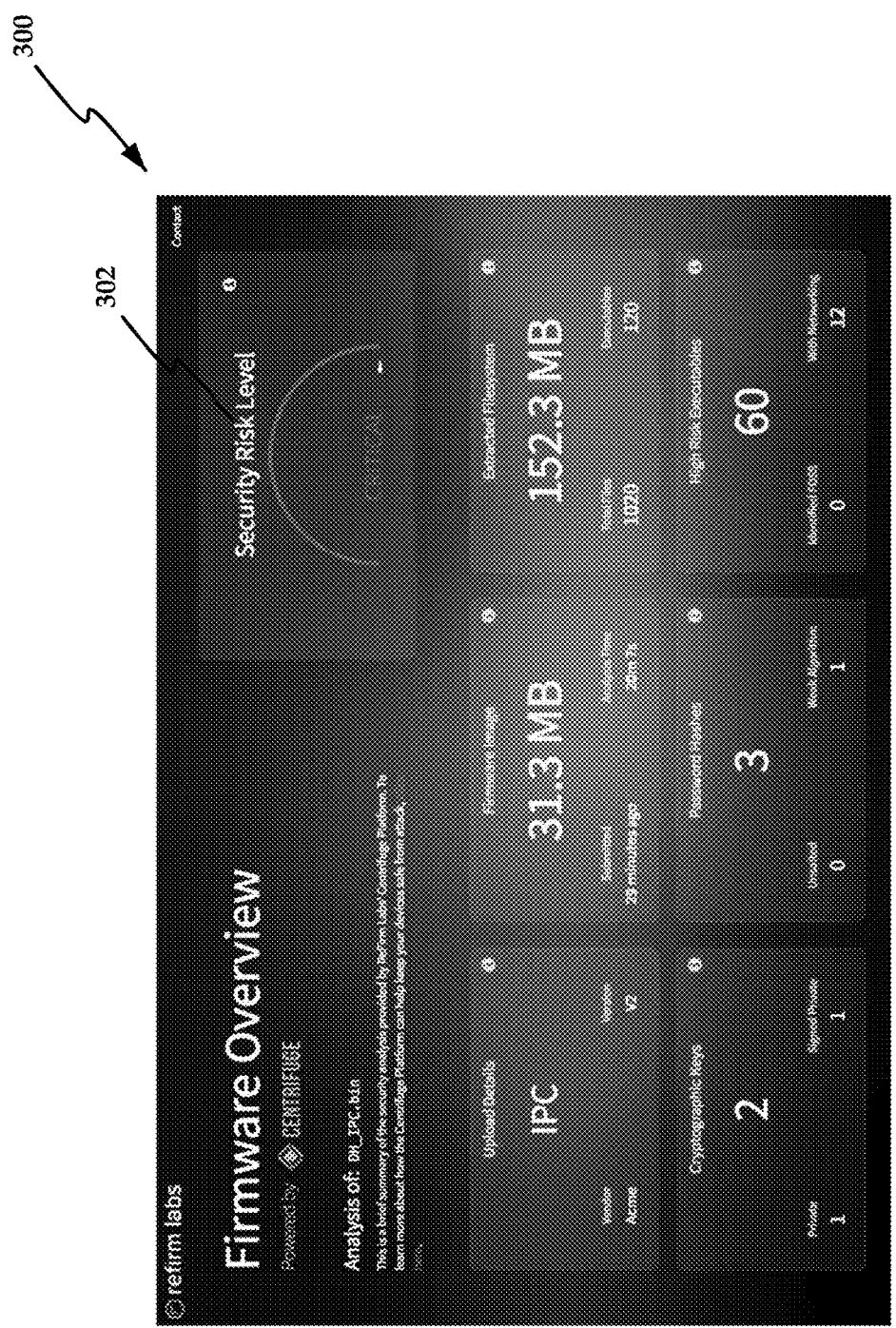
FIG. 3 is a screenshot of an example dashboard generated by the systems and methods of the present disclosure.

FIG. 3 is a dashboard 300 produced by the system 100 described above. In general, the dashboard 300 is a graphical user interface that includes panels that provide information regarding vulnerability analyses performed by the system 100. In some embodiments, the dashboard 300 comprises a security risk gauge panel 302. The gauge is indicative of a relative risk level for an analyzed firmware image. This risk level is calculated based on the individual vulnerability analyses such as review for high-risk executables, presence of embedded crypto keys, password hashes, and so forth. Indeed, the dashboard 300 includes panels representing cryptographic keys, password hashes, high-risk executables, firmware image attributes, extracted filesystem attributes, and firmware image upload data.

Figure 4:
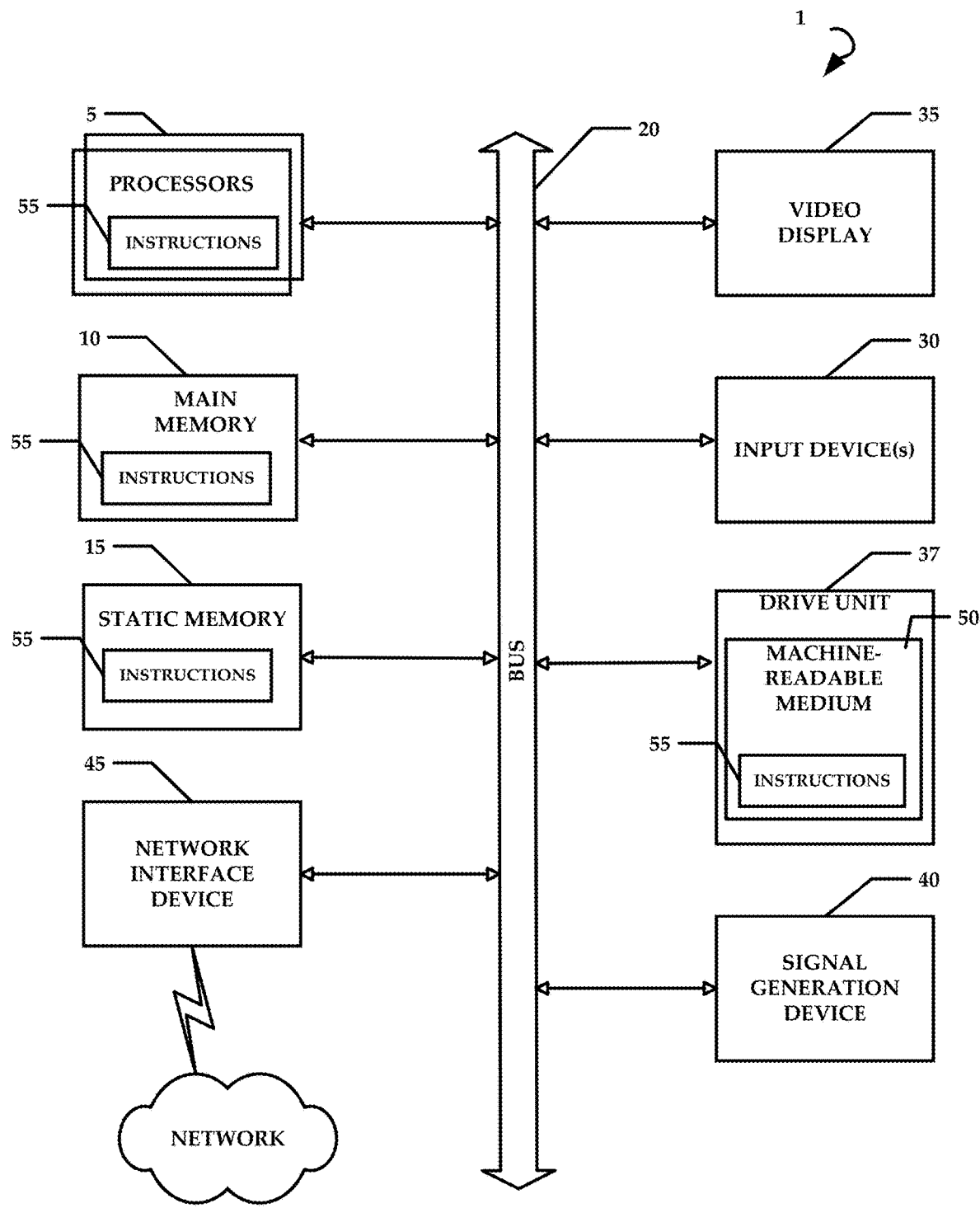
FIG. 4 is a diagrammatic representation of an example machine in the form of a computer system.

FIG. 4 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system, comprising:
a processing pipeline configured to execute instructions by a processor to:
receive a firmware image from an entity via the entity transmitting the firmware image to the system over a network, the firmware image being indicative of firmware installed on a device of the entity;
an extractor configured to execute instructions by the processor to: receive the firmware image through the processing pipeline, the extractor being configured to determine and extract files within the firmware image;
a task queue that receives the extracted files;
one or more analyzers configured to execute instructions by the processor to:
obtain the files from the task queue;
perform at least one type of vulnerability analysis on the files;
wherein the one or more analyzers are selected based on file types of the files;
and re-execute the at least one type of vulnerability analysis when the one or more analyzers are updated, wherein the at least one type of vulnerability analysis is run against all files that were previously extracted such that all firmware images for the entity are analyzed to detect new threats; and
a database that stores a log of the at least one type of vulnerability analysis, the log being associated with any of the firmware image and a device identifier of the device.

2. The system according to claim 1, wherein the database stores additional logs from other vulnerability analyses of other firmware images of the device that are older versions of the firmware image.

3. The system according to claim 1, further comprising an alerting module configured to execute instructions by the processor to transmit a message to the entity in real-time or near real-time that the at least one type of vulnerability analysis indicates that a vulnerability exists.

4. The system according to claim 3, wherein the message indicates which file of the files is implicated relative to the vulnerability.

5. The system according to claim 1, wherein the at least one type of vulnerability analysis includes comparing properties of the files to entries in a common vulnerabilities and exposures (CVE) database.

6. The system according to claim 5, further comprising a remediation module configured to execute instructions by the processor to automatically repair or remove any of the files that are determined to be vulnerable based on the comparison of the files to the CVE database.

7. The system according to claim 1, wherein the device is an Internet-of-Things (IoT) device.

8. The system according to claim 1, wherein the at least one type of vulnerability analysis includes scanning the files for artifacts when the files are executables and extracting versioning information.

9. The system according to claim 1, wherein the at least one type of vulnerability analysis includes any of:
scanning the files for strings of characters that are indicative of a vulnerability; and
analyzing binary code of the files to determine if an executable file has a vulnerability.

10. The system according to claim 1, wherein the at least one type of vulnerability analysis includes scanning the files for password hashes.

11. A method, comprising:
receiving a firmware image from an entity via transmitting the firmware image to a system over a network, the firmware image being a copy of that which is installed on a device of the entity;
placing the firmware image in a processing pipeline;
determining and extracting files within the firmware image using an extractor;
placing the extracted files in a task queue;
launching one or more analyzers to:
obtain the files from the task queue;
perform a vulnerability analysis on the files; and
wherein the one or more analyzers are selected based on file types of the files;
re-launching the one or more analyzers to perform an updated vulnerability analysis on the files at a subsequent point in time after the one or more analyzers have been updated, the updated vulnerability analysis being executed against the firmware image stored in a database; and
storing the firmware image and a log of the vulnerability analysis in the database, the log being associated with any of the firmware image and a device identifier of the device.

12. The method according to claim 11, further comprising storing additional logs from other vulnerability analyses of other firmware images of the device that are older versions of the firmware image, wherein the updated vulnerability analysis is performed against the older versions of the firmware image.

13. The method according to claim 11, further comprising transmitting a message to the entity in real-time or near real-time that the vulnerability analysis indicates that a vulnerability exists.

14. The method according to claim 13, wherein the message indicates which file of the files is implicated relative to the vulnerability.

15. The method according to claim 11, wherein the vulnerability analysis comprises comparing the files to a common vulnerabilities and exposures (CVE) database.

16. The method according to claim 11, wherein the vulnerability analysis includes any of:
scanning the files for artifacts when the files are executables and extracting versioning information;
analyzing binary code of the files to determine if an executable file has a vulnerability;
scanning the files for strings of characters that are indicative of a vulnerability; and
scanning the files for password hashes.

17. The method according to claim 11, further comprising automatically repairing or removing any of the files that are determined to be vulnerable based on a comparison of the files to a common vulnerabilities and exposures (CVE) database.

* * * * *